United States Patent
Mallier et al.

(10) Patent No.: US 11,316,596 B2
(45) Date of Patent: Apr. 26, 2022

(54) METHOD FOR DETECTING AT LEAST ONE COMPROMISED COMPUTER DEVICE IN AN INFORMATION SYSTEM

(71) Applicant: ETAT FRANçAIS REPRÉSENTÉ PAR LE DÉLÉGUÉ GÉNÉRAL POUR L'ARMEMENT, Paris (FR)

(72) Inventors: Sébastien Mallier, Bourg des Comptes (FR); Erwan Nogues, Rennes (FR); Thierry Dandois, Bruz (FR); Daniel Bigot, Guichen (FR)

(73) Assignee: ETAT FRANçAIS REPRÉSENTÉ PAR LE DÉLÉGUÉ GÉNÉRAL POUR L'ARMEMENT, Paris (FR)

( * ) Notice: Subject to any disclaimer, the term of this patent is extended or adjusted under 35 U.S.C. 154(b) by 0 days.

(21) Appl. No.: 17/262,879

(22) PCT Filed: Jun. 24, 2019

(86) PCT No.: PCT/FR2019/000103
§ 371 (c)(1),
(2) Date: Jan. 25, 2021

(87) PCT Pub. No.: WO2020/021166
PCT Pub. Date: Jan. 30, 2020

(65) Prior Publication Data
US 2021/0320730 A1 Oct. 14, 2021

(30) Foreign Application Priority Data

Jul. 26, 2018 (FR) ...................................... 1800804

(51) Int. Cl.
*H04B 17/17* (2015.01)
*H04B 17/14* (2015.01)
*H04B 17/336* (2015.01)

(52) U.S. Cl.
CPC ............. *H04B 17/17* (2015.01); *H04B 17/14* (2015.01); *H04B 17/336* (2015.01)

(58) Field of Classification Search
CPC ...... H04B 1/00; H04B 1/0003; H04B 1/0007; H04B 1/16; H04B 1/28; H04B 17/14–29;
(Continued)

(56) References Cited

U.S. PATENT DOCUMENTS

| 3,824,452 A | * | 7/1974 | Freeman | ............ | G01R 33/4616 |
| | | | | | 324/314 |
| 4,347,529 A | * | 8/1982 | Takanashi | ............. | H04N 9/083 |
| | | | | | 348/290 |

(Continued)

FOREIGN PATENT DOCUMENTS

EP    1 120 920    8/2001

OTHER PUBLICATIONS

International Search Report for PCT/FR2019/000103 dated Nov. 26, 2019, 5 pages.
(Continued)

*Primary Examiner* — James M Perez
(74) *Attorney, Agent, or Firm* — Nixon & Vanderhye (57) ABSTRACT

Disclosed is a method for detecting at least one compromised computer device in an information system, the method including: performing a frequency scan involving dividing the electromagnetic spectrum into frequency sub-bands; performing, in each frequency sub-band, a time envelope demodulation in order to recover signals transmitted by at least one computer device of the information system; converting each demodulated signal in the frequency domain; constructing a frequency spectrum on the basis of the demodulated signals in all the frequency sub-bands; finding, in each frequency sub-band of the frequency spectrum, at least one amplitude line having energy that is
(Continued)

greater than a first predefined energy threshold; and, if at least one line having energy that is greater than the first predefined energy threshold is found, indicating the presence of at least one compromised computer device transmitting compromising spurious signals.

20 Claims, 2 Drawing Sheets (58) Field of Classification Search
CPC .... H04B 17/30; H04B 17/309; H04B 17/336; H03J 7/18; H03J 1/0091
See application file for complete search history.

(56) References Cited

U.S. PATENT DOCUMENTS

| | | | | |
|---|---|---|---|---|
| 4,521,778 | A * | 6/1985 | Knepper | G01S 13/106 342/134 |
| 5,230,076 | A * | 7/1993 | Wilkinson | H04B 7/22 455/62 |
| 5,465,396 | A * | 11/1995 | Hunsinger | H04H 20/30 375/232 |
| 5,767,780 | A * | 6/1998 | Smith | F04D 27/001 340/635 |
| 5,891,038 | A * | 4/1999 | Seyed-Bolorforosh | G01S 15/108 600/447 |
| 6,005,894 | A * | 12/1999 | Kumar | H03C 5/00 329/357 |
| 6,011,508 | A * | 1/2000 | Perreault | B61L 3/225 246/122 R |
| 6,816,715 | B1 * | 11/2004 | Mano | H03J 7/18 455/161.3 |
| 7,466,261 | B1 * | 12/2008 | Hoctor | G01S 7/288 342/118 |
| 7,940,869 | B2 * | 5/2011 | Tandai | G01S 7/021 375/346 |
| 8,588,351 | B2 * | 11/2013 | Bush | H04B 1/0092 375/347 |
| 9,246,571 | B2 * | 1/2016 | Wang | H04B 7/043 |
| 9,325,369 | B2 * | 4/2016 | Lee | H04B 1/715 |
| 9,444,515 | B2 * | 9/2016 | Khan | H04B 1/7073 |
| 9,794,006 | B2 * | 10/2017 | Carlsson | H03F 3/245 |
| 9,888,314 | B2 * | 2/2018 | Garreau | G06F 3/012 |
| 10,523,342 | B1 * | 12/2019 | Kuzdeba | H04B 17/21 |
| 10,531,096 | B2 * | 1/2020 | Nogues | H04N 19/132 |
| 10,931,318 | B2 * | 2/2021 | Mahmood | H04B 1/0475 |
| 10,985,962 | B1 * | 4/2021 | Sahin | H04L 27/2605 |
| 11,101,842 | B2 * | 8/2021 | Hormis | H04B 7/15535 |
| 2003/0083831 | A1 * | 5/2003 | Agrawal | G06F 7/50 702/65 |
| 2004/0174770 | A1 * | 9/2004 | Rees | G03B 42/06 367/7 |
| 2004/0208239 | A1 * | 10/2004 | Karlsson | H04K 3/82 375/219 |
| 2007/0092018 | A1 * | 4/2007 | Fonseka | H04L 1/0054 375/265 |
| 2009/0048828 | A1 * | 2/2009 | Atlas | G10L 19/005 704/229 |
| 2010/0014559 | A1 * | 1/2010 | Nieto | H04L 27/2614 375/130 |
| 2011/0043328 | A1 * | 2/2011 | Bassali | G08C 17/02 340/5.71 |
| 2011/0251826 | A1 * | 10/2011 | McGoogan | G01H 1/003 702/189 |
| 2012/0148053 | A1 * | 6/2012 | Tan | G10K 15/02 381/1 |
| 2012/0178396 | A1 * | 7/2012 | Hotto | H04B 1/123 455/296 |
| 2012/0314872 | A1 * | 12/2012 | Tan | H04R 1/403 381/17 |
| 2013/0243296 | A1 * | 9/2013 | Nandi | G06T 5/002 382/131 |
| 2014/0204388 | A1 * | 7/2014 | Osawa | G01B 9/02063 356/479 |
| 2014/0254317 | A1 * | 9/2014 | Thompson | G01V 1/36 367/21 |
| 2016/0007113 | A1 * | 1/2016 | Garreau | G10K 11/1785 381/311 |
| 2017/0126176 | A1 * | 5/2017 | Okamoto | H03K 3/0315 |
| 2017/0201339 | A1 * | 7/2017 | Chang | H04L 27/00 |
| 2017/0237988 | A1 * | 8/2017 | Nogues | H04N 19/44 375/240.02 |
| 2017/0238084 | A1 * | 8/2017 | Garreau | G10K 11/1783 381/71.6 |
| 2018/0184378 | A1 * | 6/2018 | Fang | H04L 5/0007 |
| 2018/0352344 | A1 * | 12/2018 | Lim | H04R 25/48 |
| 2018/0372870 | A1 * | 12/2018 | Puglia | G01S 17/58 |
| 2019/0086517 | A1 * | 3/2019 | Puglia | G01S 7/4817 |
| 2019/0086518 | A1 * | 3/2019 | Hallstig | G01S 7/4815 |
| 2019/0171187 | A1 * | 6/2019 | Cella | G06N 3/086 |
| 2019/0280774 | A1 * | 9/2019 | Nazarathy | G02B 6/28 |
| 2019/0314000 | A1 * | 10/2019 | Du | A61B 8/488 |
| 2020/0096997 | A1 * | 3/2020 | Cella | G05B 19/4185 |
| 2020/0110185 | A1 * | 4/2020 | Xu | G01P 15/18 |
| 2020/0153410 | A1 * | 5/2020 | Nielsen | H03H 9/542 |
| 2020/0235769 | A1 * | 7/2020 | Wilhelmsson | H04B 1/16 |
| 2020/0291771 | A1 * | 9/2020 | Wrinch | G01V 1/48 |
| 2021/0044465 | A1 * | 2/2021 | Sundman | H04L 27/2607 |
| 2021/0082447 | A1 * | 3/2021 | Disch | G10L 21/0388 |
| 2021/0320730 | A1 * | 10/2021 | Mallier | H04B 17/14 |

OTHER PUBLICATIONS

Written Opinion of the ISA for PCT/FR2019/000103 dated Nov. 26, 2019, 5 pages.
French Search Report and Written Opinion for 1800804 dated May 28, 2019, 6 pages.

* cited by examiner

METHOD FOR DETECTING AT LEAST ONE COMPROMISED COMPUTER DEVICE IN AN INFORMATION SYSTEM

CROSS-REFERENCE TO RELATED APPLICATIONS

This application is the U.S. national phase of International Application No. PCT/FR2019/000103 filed Jun. 24, 2019 which designated the U.S. and claims priority to FR 1800804 filed Jul. 26, 2018, the entire contents of each of which are hereby incorporated by reference.

BACKGROUND OF THE INVENTION

Field of the Invention

The present invention relates to the field of information system security, and in particular relates to a method for detecting at least one compromised computer device within an information system.

Description of the Related Art

Any hardware or system which processes or transmits information in electric form produces electromagnetic disturbances. These disturbances, qualified as spurious signals, are caused by variations in the electrical behavior established in the various circuits that make up the hardware in question during its operation. Some of these disturbances can represent processed information. Intercepting and exploiting them can make it possible to reconstitute the information.

An information system is the organized set of resources (hardware, software, personnel, data, etc.) making it possible to process, store, or transmit the information through an electronic medium.

Compromising spurious signals are the (unintentional) spurious signals representative of the information processed by an information system which, once intercepted and exploited, make it possible to reconstitute all or part of the content thereof. The presence of compromising spurious signals can, for example, be due to an absence of shielding on the connector components of the computers of the information system.

The compromising spurious signals can be picked at distances of up to several tens of meters for the radiated disturbances. Furthermore, compromising spurious signals can be picked over very long distances in case of fortuitous coupling with radio transmitters.

Many products directly equipped with transmitters (radio, infrared, etc.) are commercially available, such that the power and the known characteristics of the signals transmitted by the latter can facilitate the interception of the transmitted information. Thus, the increased use of wireless communication peripherals and technologies is causing new threats that should be taken into account to ensure the confidentiality, integrity, authenticity and availability of the processed information.

One existing technique for analyzing compromising spurious signals consists in sequentially analyzing all of the computer devices of an information system (that is to say, one computing device at a time). However, this existing technique is not automatic due to the fact that an operator must analyze each computer device successively, which causes a relatively long analysis time. In this existing technique, an auditory analysis of each computer device is done from controlled test signals. This means that a narrowband analysis must be done in order to measure a high signal-to-noise ratio, which causes a relatively high analysis time in proportion to the analyzed frequency band.

Furthermore, this existing technique does not automatically make it possible to discriminate between two computer devices of an information system transmitting compromising spurious signals with close frequencies.

Further, this existing technique also does not make it possible to perform a compromise qualification without reconstitution. Indeed, the latter only offers complete reconstitution of the compromising spurious signals in order to qualify the defect, which requires precise knowledge of the full parameters of the information system.

In summary, the existing technique for analyzing compromising spurious signals is done non-automatically (analysis highly dependent on the expertise of the operator), and is unitary/slow (analysis of a single computer device at a time).

SUMMARY OF THE INVENTION

The present invention aims to address the drawbacks of the prior state of the art, by proposing a method for detecting at least one compromised computer device within an information system comprising at least one computer device, which makes it possible to simultaneously and automatically analyze all of the computer devices of the information system so as to significantly reduce the analysis time.

The objective of the compromised computer device detection is to verify that the information processed by the information system (for example made up of several computer devices) cannot be intercepted by a third party, fortuitously (related to a compromised computer device) or deliberately (related to trapping).

The present invention therefore relates to a method for detecting at least one compromised computer device within an information system comprising at least one computer device, characterized in that the method comprises the following steps:

a) performing frequency scanning consisting in dividing the electromagnetic spectrum into frequency sub-bands;

b) performing, in each frequency sub-band, a time envelope demodulation in order to recover signals transmitted by at least one computer device of the information system;

c) converting each demodulated signal in the frequency domain;

d) constructing a frequency spectrum from demodulated signals in all the frequency sub-bands;

e) finding sequentially, in each frequency sub-band of the frequency spectrum, at least one line having an energy which is greater than a first predefined energy threshold; and f) if at least one line having an energy greater than the first predefined energy threshold is found in at least one frequency sub-band, signaling the presence of at least one compromised computer device, in the information system, transmitting compromising spurious signals.

"Computer device" refers to an equipment among a desktop computer, a laptop computer, a tablet, a smartphone, a printer, a computer peripheral, a connector component, a control screen for example of the radar screen or card display type, a chart plotter, an encryption telephone.

Thus, the method according to the invention makes it possible to determine, precisely and quickly, whether one or several computer devices making up the information system (IS) are generating information leaks (that is to say, compromising spurious signals) through analysis of the frequency spectrum of the spurious signals transmitted by the at least one computer device of the information system.

The detection of compromising spurious signals (CSS) seeks to detect the leak frequencies of the CSS (for example, leak frequency of the information associated with a video display device), said detection being done, when all of the computer devices are activated, in parallel (and not sequentially), which makes it possible to save considerable analysis time.

The spurious signals emitted by the computer devices of the information system are detected using an antenna and a radio receiver (for example, software-defined radio housing, and the analysis of the received signals is done using a computing means such as at least one among a microprocessor, a microcontroller, a processor, a programmable logic component, a graphics card, associated with memory, able to implement software instructions for signal processing algorithms.

This solution is automatic (no human intervention during the detection process), parallel/rapid (analysis of several computer devices at a time), and free from physical sampling of signals on the computer devices, the analysis can therefore be done remotely, for example when the computer system is not accessible.

The compromise of a computer device of the information system can for example be due to a defect related to an absence of shielding on the connector components of the compromised computer equipment.

Each frequency sub-band of the electromagnetic spectrum potentially corresponds to a hidden channel.

The demodulation of the time envelope is very robust, since it is not sensitive to the frequency drifts, given that only the envelope of the signals is recovered.

The conversion of the demodulated signals in the frequency domain is done using a fast Fourier transform (FFT) algorithm. Other algorithms, such as temporal coherence correlators or integrators, could also be considered in the context of the present invention.

The detection, in at least one frequency sub-band, of at least one line whose energy is greater than the first predefined energy threshold, thus makes it possible to detect at least one compromised computer device in the information system.

"Compromised computer device" refers to a computer device causing information to leak fortuitously, for example due to an absence of shielding on its connector components.

The first predefined energy threshold is preset by the user and can, for example, be equal to two times the energy of the receiver noise.

According to one particular feature of the invention, the method further comprises, between step c) and step d), step c1) consisting in improving the signal-to-noise ratio through successive integrations of the demodulated signals.

Thus, the successive integrations make it possible to perform averaging of the demodulated signals so as to improve the signal-to-noise ratio.

According to one particular feature of the invention, the method, implemented within an information system comprising several computer devices, each equipped with a display device, further comprises, before step a), the step consisting in sending each computer device of the information system, a display signal with a frequency specific to the corresponding computer device, each display signal having a known frequency ratio relative to a reference frequency, and, after step f), step g) consisting in finding sequentially, in each frequency sub-band of the frequency spectrum, at least one pair of lines having a frequency ratio corresponding to one of the known frequency ratios and one of the lines of which is one of the at least one line with an energy greater than the predefined energy threshold in the corresponding frequency sub-band, and, when the other of the lines of the at least one pair of lines exceeds a second predefined energy threshold, signaling that the computer device corresponding to said frequency ratio is compromised.

Thus, in this particular feature of the invention, the method makes it possible to determine precisely and quickly, among the many computer devices making up the information system, the list of compromised computer devices which generate information leaks (that is to say, compromising spurious signals).

In this particular feature of the invention, the method makes it possible to identify the compromised computer device(s) in the IS, via a parallel (and not sequential) analysis, which makes it possible to save considerable analysis time. For example, for an IS made up of 30 computers, a factor of 30 can be saved relative to the conventional method owing to the identification in parallel of the compromised computer devices.

The identification of the compromised computer device(s) is possible owing to the display of display signals on each display device of the computer devices. These display signals aim to generate CSSs at controlled frequencies and each corresponding to a particular display device of the IS, which allows it to be identified. Thus, the proposed parallel CSS detection/identification technique comprises finding signals which are present at frequencies which "sign" the compromised computer devices which are leaking information.

In each frequency sub-band, a simultaneous search for two lines on the demodulated signal after conversion in the frequency domain is done. The originality here lies in the blind search for the frequency associated with the line whose amplitude is highest (and greater than the first predefined energy threshold). It is then assumed that this is the line corresponding to the reference frequency of a display signal. Then, it is verified whether a second line (whose amplitude is greater than the second predefined energy threshold) is present at a frequency ratio characterizing one of the display signals used; it is then assumed that this is the line corresponding to the specific frequency of one of the display signals displayed on the display devices of the computer devices, which makes it possible to precisely identify the compromised computer device corresponding to the detected frequency ratio.

The second predefined energy threshold is preset by the user and can, for example, be equal to twice the energy of the receiver noise. It should be noted that the first and second predefined energy thresholds can be identical.

According to one particular feature of the invention, each display signal is a test card intended to be displayed on the display device of the corresponding computer device, said test card comprising a pattern whose frequency is a multiple or submultiple of the reference frequency made up by a synchronization frequency associated with said test card, the frequency ratio between the frequency of the pattern and the synchronization frequency being known and specific to the corresponding computer device.

In light of the large number of computer devices making up an IS, a library of test cards is constructed, the number of elements of which is at least equal to the number of computer devices being tested. To do this, the repetitiveness of a stationary pattern appearing at a high frequency and amplitude is used in order to create the different test cards displayed on the display devices of the IS.

The definition, for each test card, of the synchronization frequency and the frequency of the pattern of the test card makes it possible to obtain a specific frequency ratio for each computer device of the IS.

According to one particular feature of the invention, the reference frequency is made up of the line synchronization frequency of the display device of the computer device.

The test cards are constructed using an algorithmic means which uses the repetition of patterns (for example, white or black lines) with different parameters for each display device, this algorithmic means aiming to generate a one-dimensional temporal compromising radio signal from a two-dimensional image.

These test cards are next displayed on the display devices in order to detect and identify, in parallel and automatically, compromised computer devices that are leaking information.

The physical properties of the "signing" test cards are used to detect them and to create an association between the detected compromise (that is to say, test card) and the computer device that is associated with it.

According to one particular feature of the invention, said frequency ratios of the set of test cards could also be numbers prime relative to one another.

According to one particular feature of the invention, the method further comprises, after step f), or if applicable, after step g), a compromise quantification step consisting in calculating, in each frequency sub-band, the signal-to-noise ratio of said line(s) exceeding the first predefined energy threshold or, if applicable, the second predefined energy threshold.

Thus, the quantification of the degree of compromise, that is to say, the level and the scope of the CSSs, via a parallel analysis, makes it possible to determine whether the risk of information leak is significant.

The quantification of the compromise, by calculation of the signal-to-noise ratio, makes it possible to provide reliable information about the degree of compromise.

According to one particular feature of the invention, the method further comprises, after step f) or, if applicable, after step g), a step for qualifying the compromise consisting in calculating, in each frequency sub-band, the frequency spread of said line(s) exceeding the first predefined energy threshold or, if applicable, the second predefined energy threshold, and determining, in each frequency sub-band, as a function of the width of the calculated frequency spread, whether the compromising spurious signals associated with said line(s) exceeding the first predefined energy threshold or, if applicable, the second predefined energy threshold can or cannot be reconstituted.

Thus, the qualification of the degree of compromise, that is to say, the ability to reconstruct the CSS without going through a reconstruction step, via a parallel analysis, makes it possible to determine whether the risk of an information leak is proven, without knowing the parameters of the information which has leaked.

The possibly compromising spurious signals are thus evaluated owing to two distinct indicators linked to the detected information:

quantification indicator: this indicator makes it possible to optimize the costs incurred by the countermeasures in the face of the CSSs (for example, installation of Faraday cage(s), use of metallized paint);

qualification indicator: this indicator makes it possible to determine the type of information which may be compromised (for example, small or large characters of a text document) without complete reconstruction of the signal.

The quantification/qualification steps are primarily based on the exploitation of the results of the detection process. Indeed, a correlation exists between the measurement results of the detected bandwidth and the capacity to reconstruct the CSSs. As an example, if the detected band is equal to 10 MHz while the CSSs have a bandwidth of 20 MHz, the reconstitution is poor. Conversely, if the detected band is equal to 30 MHz while the CSSs have a bandwidth of 20 MHz, the reconstitution will be good. It should be noted that in the latter case, this criterion does not require the use of a reconstitution tool, which is a complex tool to set up and whose results may cause non-detections.

According to one particular feature of the invention, the method further comprises, after step f) or, if applicable, after step g), the step consisting in displaying, on a user interface, the compromised computer device signaling results comprising the line(s) exceeding the first predefined energy threshold or, if applicable, the second predefined energy threshold in each frequency sub-band, and if applicable the compromise quantification and qualification results.

The results are displayed in an intelligible form suitable for users who are not experts in the field.

For example, for each scanned frequency (from 10 MHz to 1 GHz) of the frequency spectrum, a vertical bar in a first color can represent the energy associated with the line synchronization pattern of a display device and a vertical bar in a second color can represent the energy associated with the test card which was detected. The CSS detection is symbolized by the actual presence of vertical bars in first and second colors (representing the detected lines), these bars indicating that the energies of the line synchronization patterns and the detected test cards respectively exceeded the first and second predefined energy thresholds.

It should be noted that the display of the results could also assume any other form, without departing from the scope of the present invention.

In order to facilitate the reading of the results, a frequency zoom can be done on the line detection zones. The identification of the compromised computer device(s) simply consists in connecting the detection results to the associated test card index, the name or the number of each compromised computer device next being displayed. The displayed quantification result for the compromise is connected to the measurement of the height of the vertical bars representing the detected lines. The displayed qualification result for the compromise is related to the measurement of the frequency spread of the vertical bars representing the detected lines.

The present invention also relates to a computer system comprising at least one computer device, characterized in that the information system further comprises a signal analysis device comprising a reception antenna and a computing means which are configured to carry out the method for detecting at least one compromised computer device as described above.

BRIEF DESCRIPTION OF THE DRAWINGS

To better illustrate the subject matter of the present invention, two embodiments will be described below, as an illustration and non-limitingly, with reference to the appended drawings.

In these drawings.

DESCRIPTION OF THE PREFERRED EMBODIMENTS

Figure 1:
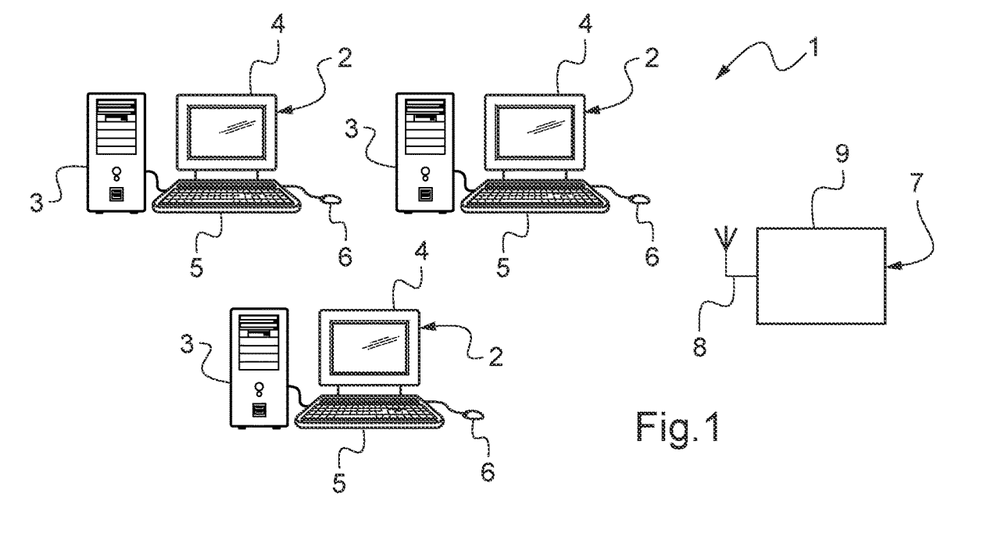
FIG. 1 is a schematic diagram of an information system according to a first embodiment of the invention.

FIG. 1 shows an information system 1 according to a first embodiment of the invention.

The information system 1 comprises three computer devices 2.

It should be noted that the information system 1 could also comprise any number of computer devices 2, without departing from the scope of the present invention.

Each computer device 2 comprises a desktop computer 3, connected to which are a display device 4 of the screen type, a keyboard 5 and a mouse 6.

It should be noted that each computer device 2 could also be any device among a laptop computer, a tablet, a smartphone, a printer, a computer peripheral, a connector component, a control screen of the radar screen or card display type, a chart plotter, an encryption telephone, without departing from the scope of the present invention.

One or several computer devices 2 of the information system 1 can be compromised (that is to say, can leak information fortuitously, for example due to a lack of shielding on the connector components of the compromised computer device 2).

The information system 1 further comprises a signal analysis device 7 comprising a reception antenna 8 and computing means 9 which are configured to carry out a method for detecting at least one compromised computer device 2 within an information system 1 comprising the steps consisting of:
  a) performing frequency scanning consisting in dividing the electromagnetic spectrum into frequency subbands, each frequency sub-band corresponding to a hidden channel;
  b) performing, in each frequency sub-band, a time envelope demodulation in order to recover spurious signals transmitted by the computer devices 2 and received by the reception antenna 8 of the signal analysis device 7;
  c) converting each demodulated signal in the frequency domain using the computing means 9 of the signal analysis device 7, preferably by using a fast Fourier transform (FFT) algorithm; and
    c1) optionally, improving the signal-to-noise ratio through successive integrations of the demodulated signals using the computing means 9;
  d) constructing a frequency spectrum from demodulated signals in all the frequency sub-bands using the computing means 9;
  e) finding sequentially, in each frequency sub-band of the frequency spectrum, at least one line having an energy that is greater than a first predefined energy threshold using the computing means 9; and
  f) if at least one line having an energy greater than the first predefined energy threshold is found in at least one frequency sub-band, signaling the presence of at least one compromised computer device 2, in the information system 1, transmitting compromising spurious signals, using the computing device 9.

The computing device 9 is at least one among a microprocessor, a microcontroller, a processor, a programmable logic component, a graphics card, associated with memory, able to implement software instructions of signal processing algorithms.

The signal analysis device 7 makes it possible to precisely and quickly determine whether one or several computer devices 2 making up the information system 1 are generating information leaks (that is to say, compromising spurious signals) through analysis of the frequency spectrum of the spurious signals transmitted by all of the computer devices 2 of the information system 1.

The detection of the compromising spurious signals (CSS) is done, when all of the computer devices 2 are activated, in parallel (and not sequentially), which makes it possible to save considerable analysis time.

The first predefined energy threshold is preset by the user and can, for example, be equal to twice the energy of the receiver noise.

Figure 2:
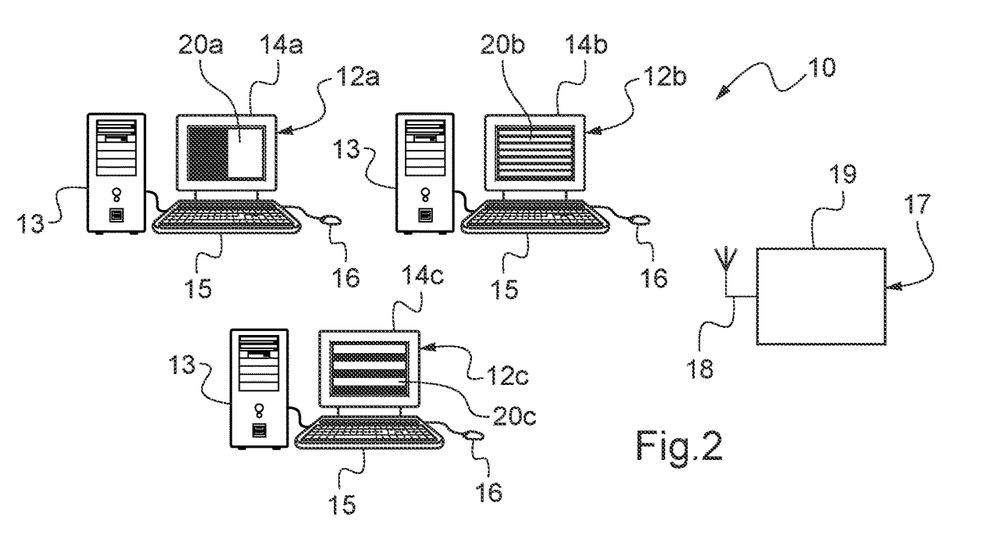
FIG. 2 is a schematic diagram of an information system according to a second embodiment of the invention.

FIG. 2 shows an information system 10 according to a second embodiment of the invention.

Like elements between the first embodiment of the invention in FIG. 1 and this second embodiment of the invention bear like reference numerals to which 10 has been added, except for the information system referenced 10, and will not be described in more detail here when they have identical structures.

The information system 10 comprises three computer devices 12a, 12b and 12c, each computer device 12a, 12b, 12c comprising a display device of the screen type 14a, 14b, 14c, respectively.

Each of the display devices 14a, 14b, 14c of the computer devices 12a, 12b, 12c displays a display signal with a frequency which is specific to the corresponding computer device 12a, 12b, 12c.

Each display signal is a test card displayed on the display device 14a, 14b, 14c of the corresponding computer device 12a, 12b, 12c.

Each test card comprises a pattern (comprising white and black lines) whose frequency is a multiple or submultiple of the line synchronization frequency of the corresponding display device 14a, 14b, 14c.

For each test pattern, the frequency ratio between the frequency of the pattern of the test card and the line synchronization frequency is known and specific to the corresponding computer device 12a, 12b, 12c.

In the particular case of FIG. 2, the display device 14a of the computer device 12a displays a test card 20a whose pattern frequency is equal to two times the line synchronization frequency, the test device 14b of the computer device 12b displays a test card 20b whose pattern frequency is equal to ½ times the line synchronization frequency, and the display device 14c of the computer device 12c displays a test card 20c whose pattern frequency is equal to ¼ times the line synchronization frequency.

The test cards 20a, 20b, 20c aim to generate spurious signals when the computer devices 12a, 12b, 12c are compromised and are leaking information, each test pattern 20a, 20b, 20c having a known frequency ratio and corresponding to a particular display device 14a, 14b, 14c of the information system 10, which allows the identification of the faulty computer devices 12a, 12b, 12c.

It should be noted that the frequency ratios of the set of test cards 20a, 20b, 20c could also be numbers prime relative to one another, without departing from the scope of the present invention.

Figure 3:
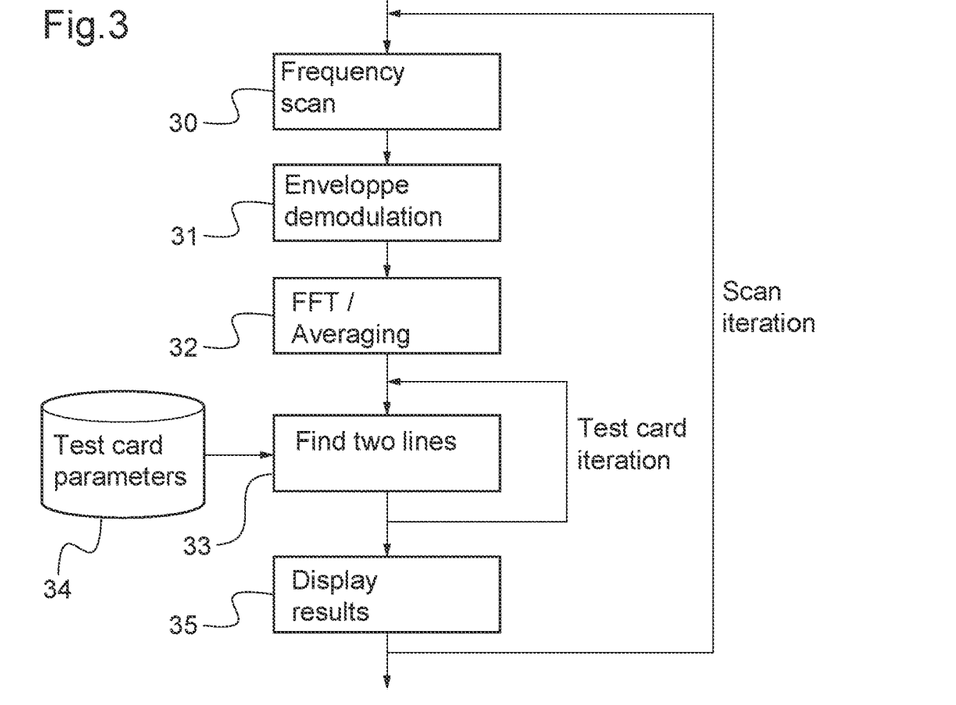
FIG. 3 is a flowchart illustrating the detection method according to the second embodiment of the invention.

FIG. 3 shows a flowchart illustrating the method for detecting compromised computer devices 12a, 12b, 12c according to the second embodiment of the invention implemented by the signal analysis device 17.

Said method for detecting compromised computer devices 12a, 12b, 12c implemented by the signal analysis device 17 comprises the following steps:
- performing 30 frequency scanning consisting in dividing the electromagnetic spectrum into frequency sub-bands, each frequency sub-band corresponding to a hidden channel;
- performing 31, in each frequency sub-band, a time envelope demodulation for recovering spurious signals transmitted by the computer devices 12a, 12b, 12c and received by the reception antenna 18 of the signal analysis device 17;
- converting 32 each demodulated signal in the frequency domain using the computing device 19 of the signal analysis device 17, by using a fast Fourier transform (FFT) algorithm, and improving the signal-to-noise ratio through successive integrations (averaging) of the demodulated signals using the computing means 19;
- constructing a frequency spectrum from demodulated signals in all of the frequency sub-bands using the computing means 19;
- finding 33 sequentially, using the computing means 19, in each frequency sub-band of the frequency spectrum, at least one pair of lines having a frequency ratio corresponding to one of the known frequency ratios 34 of the test cards 20a, 20b, 20c and whereof one of the lines has an energy greater than the first predefined energy threshold, and, when the other of the lines of the at least one pair of lines exceeds a second predefined energy threshold, indicating that the computer device 12a, 12b, 12c corresponding to said frequency ratio is compromised; and
- displaying 35 the line search results and signaling on a user interface.

The second predefined energy threshold is preset by the user and can, for example, be equal to 1.5 times the energy of the receiver noise. It should be noted that the first and second predefined energy thresholds can be identical.

Thus, the signal analysis device 17 makes it possible to determine precisely and quickly, via a parallel (and not sequential) analysis, among the computer devices 12a, 12b, 12c making up the information system 10, the list of compromised computer devices 12a, 12b, 12c which are generating information leaks (that is to say, compromising spurious signals).

During the line search step 33, a blind search for the frequency associated with the line whose amplitude is the highest (and greater than the first predefined energy threshold) is done. It is then assumed that this is the line corresponding to the line synchronization frequency of a test card 20a, 20b, 20c. Next, it is verified whether a second line (whose amplitude is greater than the second predefined energy threshold) is present at a frequency ratio characterizing one of the test cards 20a, 20b, 20c used. It is then assumed that this is the line corresponding to the specific pattern frequency of one of the test cards 20a, 20b, 20c displayed on the display devices 14a, 14b, 14c of the computer devices 12a, 12b, 12c, which allows a precise identification of the compromised computer device 12a, 12b, 12c corresponding to the detected frequency ratio.

The method could also comprise, between the search step 33 and the display step 35, a compromise quantification step consisting in calculating, in each frequency sub-band, the signal-to-noise ratio of the detected lines exceeding the first and second predefined energy thresholds.

The method could also comprise, between the search step 33 and the display step 35, a compromise qualification step consisting in calculating, in each frequency sub-band, the frequency spread of the detected lines exceeding the first and second predefined energy thresholds, and in determining, in each frequency sub-band, as a function of the width of the calculated frequency spread, whether the compromising spurious signals associated with said lines exceeding the first and second predefined energy thresholds can or cannot be reconstituted.

The qualification of the degree of compromise, that is to say, the capacity to reconstruct the compromising spurious signals without a reconstruction step, makes it possible to determine whether the risk of information leak is proven, without knowing the parameters of the information which is leaked.

The possibly compromising spurious signals are thus evaluated using two separate indicators related to the detected information:
- the quantification indicator: this indicator makes it possible to optimize the costs incurred by the countermeasures in the face of the CSSs (for example, installation of Faraday cage(s), use of metallized paint);
- qualification indicator: this indicator makes it possible to determine the type of information which may be compromised (for example, small or large characters of a text document) without complete reconstitution of the signal.

Figure 4:
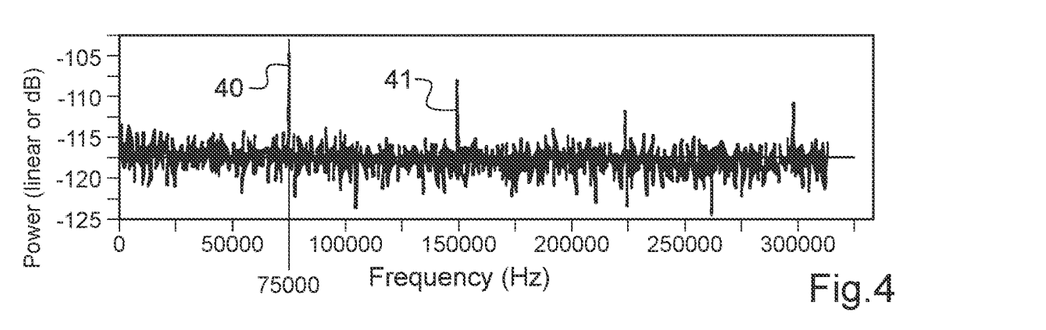
FIG. 4 is a graph by way of example illustrating the frequency spectrum of spurious signals received in one of the frequency sub-bands.

FIG. 4 shows a graph as an example illustrating the frequency spectrum of a demodulated spurious signal received in one of the frequency sub-bands.

In this graph as an example, the pair of lines having the highest powers, namely the first line 40 at a frequency of 75 kHz and the second line 41 at a frequency of 150 kHz, are two lines whose frequency ratio corresponds to a known frequency ratio of one of the displayed cards.

In particular, the second line 41 corresponds to the corresponding displayed line synchronization frequency, and the first line 40 corresponds to the frequency of the corresponding displayed test card.

In practice, the line having the highest power, namely the first line 40, has first been considered to be the line corresponding to the line synchronization frequency, but no additional line corresponding to one of the known frequency ratios has been found, the second line 41 has then next been considered to be the line corresponding to the line synchronization frequency, then it has been found that the first line 40 corresponded, with the second line 41, to a known test card frequency ratio, such that the first line 40 was considered to be the line corresponding to the frequency of the test card.

Figure 5:
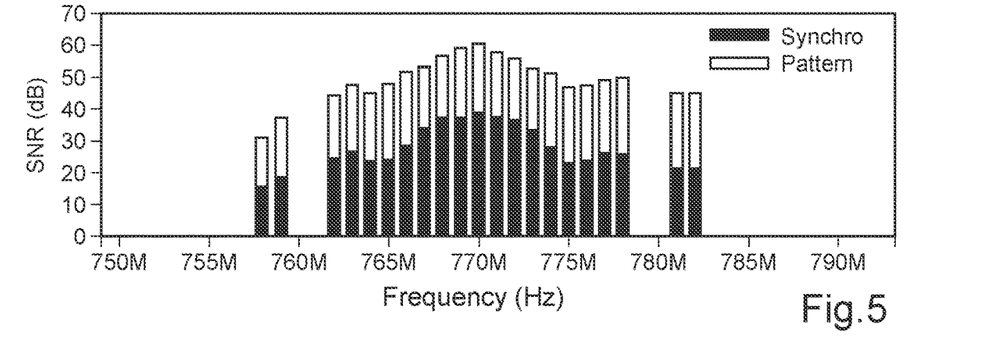
FIG. 5 is a graph illustrating a display by way of example of CSS detection results in the frequency spectrum.

FIG. 5 shows a graph illustrating a display as an example of compromising spurious signal detection results in the frequency spectrum.

The results are displayed in an intelligible form suitable for users who are not experts in the field.

For each scanned frequency of the frequency spectrum, a black vertical bar represents the signal-to-noise ratio (SNR) in dB associated with the line synchronization frequency of a display device and a white vertical bar (superimposed on the black vertical bar of the same frequency) represents the SNR associated with the pattern frequency of the test card which has been detected. The detection of compromising spurious signals is symbolized by the effective presence of black and white vertical bars (representing the detected lines), these bars indicating that the energies of the detected line synchronization and pattern test card frequencies have respectively exceeded the first and second predefined energy thresholds.

It should be noted that the display of the results could also assume any other form, without departing from the scope of the present invention.

To facilitate the reading of the results, a frequency zoom can be done on the line detection zones (in the particular case of FIG. 5, from 750 to 790 MHz). The identification of the compromised computer device(s) 12a, 12b, 12c simply consists in connecting the detection results to the associated test card index.

The name or the number of each detected compromised computer device 12a, 12b, 12c could also be displayed.

The compromise quantification result could also be displayed, the latter being linked to the measurement of the height of the vertical bars representing the detected lines.

The compromise qualification result could also be displayed, the latter being linked to the measurement of the frequency spread of the vertical bars representing the detected lines.

The invention claimed is:

1. A method for detecting at least one compromised computer device within an information system comprising at least one computer device, wherein the method comprises the following steps:
   a) performing frequency scanning consisting in dividing the electromagnetic spectrum into frequency sub-bands;
   b) performing, in each frequency sub-band, a time envelope demodulation in order to recover signals transmitted by the at least one computer device of the information system;
   c) converting each demodulated signal in the frequency domain;
   d) constructing a frequency spectrum from demodulated signals in all the frequency sub-bands;
   e) finding sequentially, in each frequency sub-band of the frequency spectrum, at least one line having an energy greater than a first predefined energy threshold; and
   f) if at least one line having an energy greater than the first predefined energy threshold is found in at least one frequency sub-band, signaling the presence of at least one compromised computer device transmitting compromising spurious signals in the information system.

2. The method according to claim 1, wherein the method further comprises, between step c) and step d), step c1) consisting in improving the signal-to-noise ratio through successive integrations of the demodulated signals.

3. The method according to claim 1, implemented within an information system comprising several computer devices, each equipped with a display device, wherein the method further comprises, before step a), the step consisting in sending each computer device of the information system a display signal with a frequency specific to the corresponding computer device, each display signal having a known frequency ratio relative to a reference frequency, and, after step f), step g) consisting in finding sequentially, in each frequency sub-band of the frequency spectrum, at least one pair of lines having a frequency ratio corresponding to one of the known frequency ratios and one of the lines of which is one of the at least one line with an energy greater than the predefined energy threshold in the corresponding frequency sub-band, and, when the other of the lines of the at least one pair of lines exceeds a second predefined energy threshold, signaling that the computer device corresponding to the frequency ratio is compromised.

4. The method according to claim 3, wherein each display signal is a test card intended to be displayed on the display device of the corresponding computer device, the test card comprising a pattern whose frequency is one of a multiple and a submultiple of the reference frequency made up by a synchronization frequency associated with the test card, the frequency ratio between the frequency of the pattern and the synchronization frequency being known and specific to the corresponding computer device.

5. The method according to claim 4, wherein the reference frequency is made up of the line synchronization frequency of the display device of the computer device.

6. The method according to claim 4, wherein the frequency ratios of the set of test cards are numbers prime relative to one another.

7. The method according to claim 1, wherein the method further comprises, after step f), a compromise quantification step consisting in calculating, in each frequency sub-band, the signal-to-noise ratio of the one or more lines exceeding the first predefined energy threshold.

8. The method according to claim 1, wherein the method further comprises, after step f) a step for qualifying the compromise consisting in calculating, in each frequency sub-band, the frequency spread of the lines exceeding the first predefined energy threshold, and determining, in each frequency sub-band, as a function of the width of the calculated frequency spread, whether the compromising spurious signals associated with the lines exceeding the first predefined energy threshold can be reconstituted.

9. The method according to claim 1, wherein the method further comprises, after step f), the step consisting in displaying, on a user interface, the compromised computer device signaling results comprising the lines exceeding the first predefined energy threshold in each frequency sub-band.

10. An information system comprising at least one computer device, wherein the information system further comprises a signal analysis device comprising a reception antenna and a computing means which are configured to carry out the method for detecting at least one compromised computer device according to claim 1.

11. The method according to claim 3, wherein the method further comprises, after step g), a compromise quantification step consisting in calculating, in each frequency sub-band, the signal-to-noise ratio of the one or more lines exceeding the second predefined energy threshold.

12. The method according to claim 1, wherein the method further comprises, after step f) a step for qualifying the compromise consisting in calculating, in each frequency sub-band, the frequency spread of the lines exceeding the first predefined energy threshold, and determining, in each frequency sub-band, as a function of the width of the calculated frequency spread, whether the compromising spurious signals associated with the lines exceeding the first predefined energy threshold can be reconstituted.

13. The method according to claim 3, wherein the method further comprises, after step g), a step for qualifying the compromise consisting in calculating, in each frequency sub-band, the frequency spread of the lines exceeding the second predefined energy threshold, and determining, in each frequency sub-band, as a function of the width of the calculated frequency spread, whether the compromising spurious signals associated with the lines exceeding the second predefined energy threshold can be reconstituted.

14. The method according to claim 9, wherein the method further comprises displaying the compromise quantification and qualification results.

15. The method according to claim 3, wherein the method further comprises, after step g), the step consisting in displaying, on a user interface, the compromised computer device signaling results comprising the lines exceeding the second predefined energy threshold in each frequency sub-band.

16. The method according to claim 15, wherein the method further comprises displaying the compromise quantification and qualification results.

17. The method according to claim 2, implemented within an information system comprising several computer devices, each equipped with a display device, wherein the method further comprises, before step a), the step consisting in sending each computer device of the information system a display signal with a frequency specific to the corresponding computer device, each display signal having a known frequency ratio relative to a reference frequency, and, after step f), step g) consisting in finding sequentially, in each frequency sub-band of the frequency spectrum, at least one pair of lines having a frequency ratio corresponding to one of the known frequency ratios and one of the lines of which is one of the at least one line with an energy greater than the predefined energy threshold in the corresponding frequency sub-band, and, when the other of the lines of the at least one pair of lines exceeds a second predefined energy threshold, signaling that the computer device corresponding to the frequency ratio is compromised.

18. The method according to claim 5, wherein the frequency ratios of the set of test cards are numbers prime relative to one another.

19. The method according to claim 2, wherein the method further comprises, after step f), a compromise quantification step consisting in calculating, in each frequency sub-band, the signal-to-noise ratio of the one or more lines exceeding the first predefined energy threshold.

20. The method according to claim 3, wherein the method further comprises, after step f), a compromise quantification step consisting in calculating, in each frequency sub-band, the signal-to-noise ratio of the one or more lines exceeding the first predefined energy threshold.

* * * * *